US007961090B2

(12) United States Patent
Hu

(10) Patent No.: US 7,961,090 B2
(45) Date of Patent: Jun. 14, 2011

(54) METHOD AND SYSTEM FOR CONTROLLING LED WITH POWER LINE CARRIER

(75) Inventor: Yu-Chou Hu, Nantou County (TW)

(73) Assignee: Intematix Technology Center Corp., Taoyuan (TW)

( * ) Notice: Subject to any disclaimer, the term of this patent is extended or adjusted under 35 U.S.C. 154(b) by 393 days.

(21) Appl. No.: 12/347,383

(22) Filed: Dec. 31, 2008

(65) Prior Publication Data

US 2009/0171510 A1 Jul. 2, 2009

Related U.S. Application Data

(60) Provisional application No. 61/006,237, filed on Jan. 2, 2008.

(51) Int. Cl.
*H04M 11/04* (2006.01)
*G08B 5/22* (2006.01)
*G05F 1/00* (2006.01)

(52) U.S. Cl. .................. 340/538; 340/815.45; 340/332; 340/538.11; 340/538.15; 315/250; 315/294; 362/800

(58) Field of Classification Search .................. 340/538
See application file for complete search history.

(56) References Cited

U.S. PATENT DOCUMENTS

| | | | | |
|---|---|---|---|---|
| 4,429,299 | A * | 1/1984 | Kabat et al. | 340/4.21 |
| 4,992,774 | A * | 2/1991 | McCullough | 345/204 |
| 5,031,082 | A * | 7/1991 | Bierend | 362/233 |
| 6,448,899 | B1 * | 9/2002 | Thompson | 340/815.4 |
| 6,795,191 | B2 * | 9/2004 | Barbehenn | 356/445 |
| 2007/0001654 | A1 * | 1/2007 | Newman, Jr. | 323/235 |

* cited by examiner

*Primary Examiner* — Donnie L Crosland

(74) *Attorney, Agent, or Firm* — Chun-Ming Shih; HDLS IPR Services

(57) ABSTRACT

A method and a system for controlling LED with power line carrier are disclosed. The system contains a host controller, an electric power conductor, and at least a luminous device, and the luminous device further containing an environmental data collection module. The method comprises the steps of providing a power line carrier module to both the host controller and the luminous devices; the luminous devices detecting a set of environmental data by the environmental data collection module; the luminous devices transmitting the set of environmental data to the host controller; the host controller recording and analyzing the set of environmental data; and the host controller sending a control signal to the luminous devices according to the analysis. Therein the control signal and the set of environmental data are transmitted by the power line carrier module through the electric power conductor.

18 Claims, 4 Drawing Sheets

METHOD AND SYSTEM FOR CONTROLLING LED WITH POWER LINE CARRIER

BACKGROUND OF THE INVENTION

1. Field of the Invention

The present invention is related to light emitting diode (LED) control, especially to the method and system for controlling LED with power line carrier (PLC).

2. Description of Related Art

Nowadays, people have created various electronic devices which make the life much more convenient. But with more and more electronic devices being used, the transmission line needed also increases accordingly. Therefore, many technologies have been explored so as to reduce the amount of usage for transmission lines, such as wireless transmission technologies, automation technologies, or power line carrier (PLC) technologies, etc.

Therein the power line carrier or power line communication technologies are systems for carrying data on conductors that are also used for electric power transmission. Electric power is transmitted over high voltage power transmission lines, distributed over medium voltage, and used inside buildings at lower voltages. Power line carrier technologies can be applied at each stage of high, medium, or low voltage.

All power line carrier systems operate by impressing a modulated carrier signal on the wiring system. Different types of power line carrier technologies use different frequency bands, depending on the signal transmission characteristics of the power wire being used. Since the power wire system was originally intended for transmission of alternating current power, the power wire circuits have been designed only with a limited ability to carry power and data in higher frequencies, and various propagation problems act as limiting factors for each type of power line carrier technologies.

Light emitting diode (LED) is a diode that emits light when an electric current is applied in the forward direction of the device. LEDs are widely used as indicator lights on electronic devices and increasingly in higher power applications such as flashlights and area lighting. An LED is usually a small area (less than 1 $mm^2$) light source, often with optics added directly on top of the chip to shape its radiation pattern and assist in reflection. The color of the emitted light depends on the composition and condition of the material used, and can be infrared, visible, or ultraviolet. In addition to lighting, interesting applications include using Ultraviolet-LED for sterilization and disinfection, and as a grow light to enhance photosynthesis in plants.

With more and more LEDs being used, the importance and need of LED control are also increasing. Generally, many signal transmission lines are required for controlling LEDs that are numerous in number, and the costs and resources consumption of setting up numerous signal transmission line wirings are relatively high. Moreover, the difficulty of setting up or removing sets of LED wirings increases due to these wirings.

SUMMARY OF THE INVENTION

An object of the present invention is to provide a method and a system for controlling LED with power line carrier, by carrying data on conductors which are also used for electric power transmission so as to reduce the amount of transmission lines used in LED wirings. Therefore, the costs, resources consumption, and difficulties of setting up and removing the LED wirings are lowered.

For achieving the objective described above, according to an embodiment of the present invention, a system for controlling light emitting diode with power line carrier is provided, the system comprising at least a luminous device for illumination, a host controller for controlling the luminous device, and an electric power conductor.

The luminous device mainly contains a terminal microprocessor for data and signals processing and calculation; a terminal power line carrier module, which is coupled with the terminal microprocessor for data modulation and demodulation; a terminal power supply module, which is coupled with the terminal microprocessor for providing static power supply; at least a light emitting diode (LED), which is coupled with the terminal microprocessor and the terminal power supply module; and at least a LED driving module, which is coupled between the terminal microprocessor, the terminal power supply module, and the LED, for regulating electric current and voltage, and protecting and controlling the LED.

The host controller mainly contains a host microprocessor for signals and data processing and control; a host power line carrier module, which is coupled with the host microprocessor for data and signals modulation and demodulation, a host power supply module, which is coupled with the host microprocessor for providing static power supply; a communication and control module, which is coupled with the host microprocessor for providing user with control capability.

Further more the electric power conductor is connected with the terminal power line carrier module, the terminal power supply module, the host power line carrier module; and the host power supply module is for carrying electric power, data, and signals.

Whereby the data and signal transmitting between the host controller and the luminous device are all through the electric power conductor, and do not need any extra transmission line.

According to another embodiment of the present invention, a method for controlling LED with power line carrier is provided, applicable to a system for controlling LED. The system contains a host controller, an electric power conductor, and at least a luminous device, and the luminous device further containing an environmental data collection module. The method comprises the steps of providing a power line carrier module to both the host controller and the luminous devices; the luminous devices detecting a set of environmental data by the environmental data collection module; the luminous devices transmitting the set of environmental data to the host controller; the host controller recording and analyzing the set of environmental data; and the host controller sending a control signal to the luminous devices according to the analysis. Therein the control signal and the set of environmental data are transmitted by the power line carrier module through the electric power conductor.

By using the power line carrier module to transmit the control signals and the environmental data, the amount of LED wirings can be reduced. Therefore, the costs, resources consumption, and difficulties of setting up and removing the LED wirings are lowered according to the present invention.

For further understanding of the present invention, reference is made to the following detailed description illustrating the embodiments and examples of the present invention. The description is only for illustrating the invention, not for limiting the scope of the claim.

BRIEF DESCRIPTION OF THE DRAWINGS

The drawings included herein provide further understanding of the present invention. A brief introduction of the drawings is as follows.

DETAILED DESCRIPTION OF PREFERRED EMBODIMENTS

The present invention is illustrated with embodiments and attached drawings. However, the present invention is not intended to be limited thereby.

Figure 1:
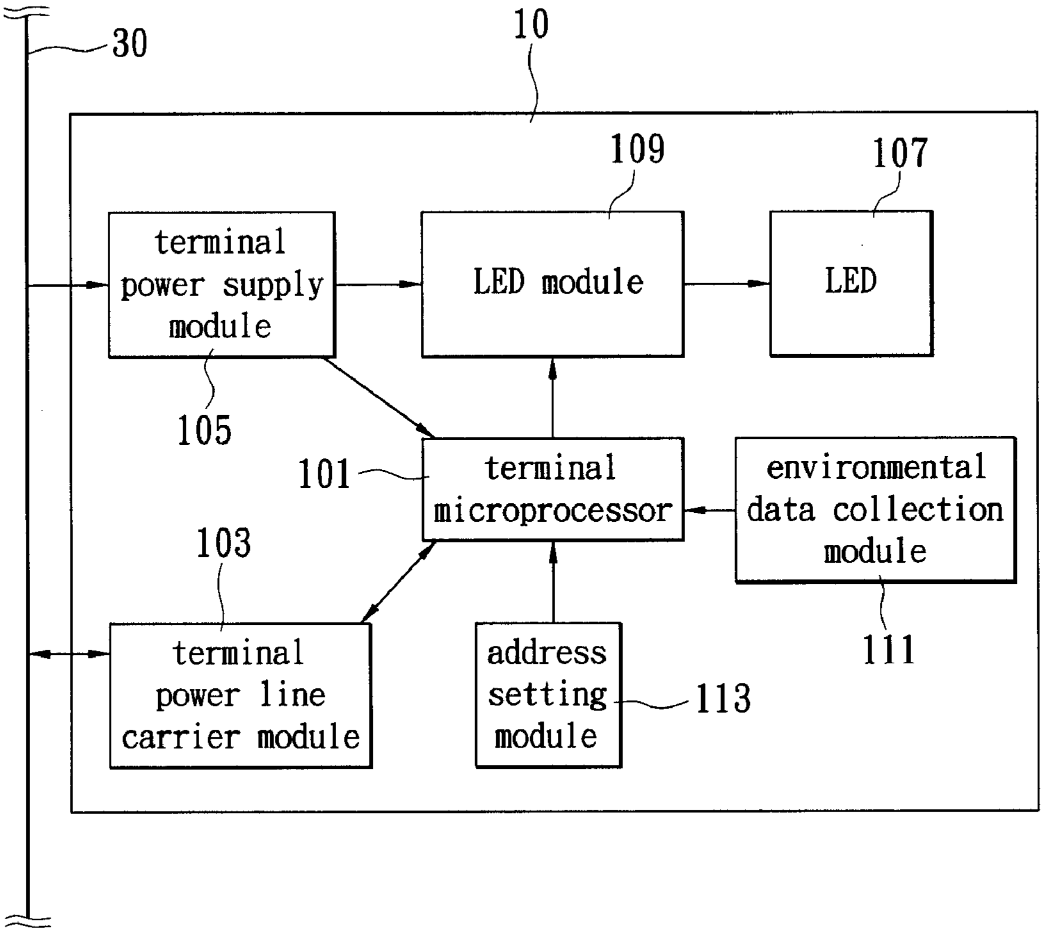
FIG. 1 is a device block diagram of the luminous device according to an embodiment the present invention.

Referring to FIG. 1, showing a device block diagram of a luminous device 10 according to an embodiment of the present invention, the luminous device 10 mainly comprises a terminal microprocessor 101 for data and signal processing; a terminal power line carrier module 103, which is coupled with the terminal microprocessor 101, for data and signal modulation and demodulation on the electric power conductor 30; a terminal power supply module 105, which is coupled with the terminal microprocessor 101, for regulating the power from the electric power conductor 30; at least a light emitting diode (LED) 107, which is coupled with the terminal microprocessor 101 and the terminal power supply module 105; and at least a light emitting diode (LED) driving module 109, which is coupled between the terminal microprocessor 101, the terminal power supply module 105, and the light emitting diode 107, and the LED driving module 109 uses pulse width modulation (PWM) for regulating voltage and electric current of the input power, and protecting and controlling the LED 107. Wherein the modulation schemes of the terminal power line carrier module 103 may be differential phase shift keying (DPSK), orthogonal frequency division multiplexing (OFDM), or frequency shift keying (FSK), etc.; and the color of the LED 107 may be red, yellow, blue, green, white, infrared, or ultraviolet, etc.

Referring to FIG. 1 again, the luminous device 10 further comprises an environmental data collection module 111, which is coupled with the terminal microprocessor 101, for sensing environmental circumstances; and an address setting module 113, which is coupled with the terminal microprocessor 101, for setting the device address of the luminous device 10. Therein the environmental data collection module 111 comprises a luminance sensor, a visibility sensor, an object sensor, a voice sensor, and a power consumption sensor, etc.

Figure 2:
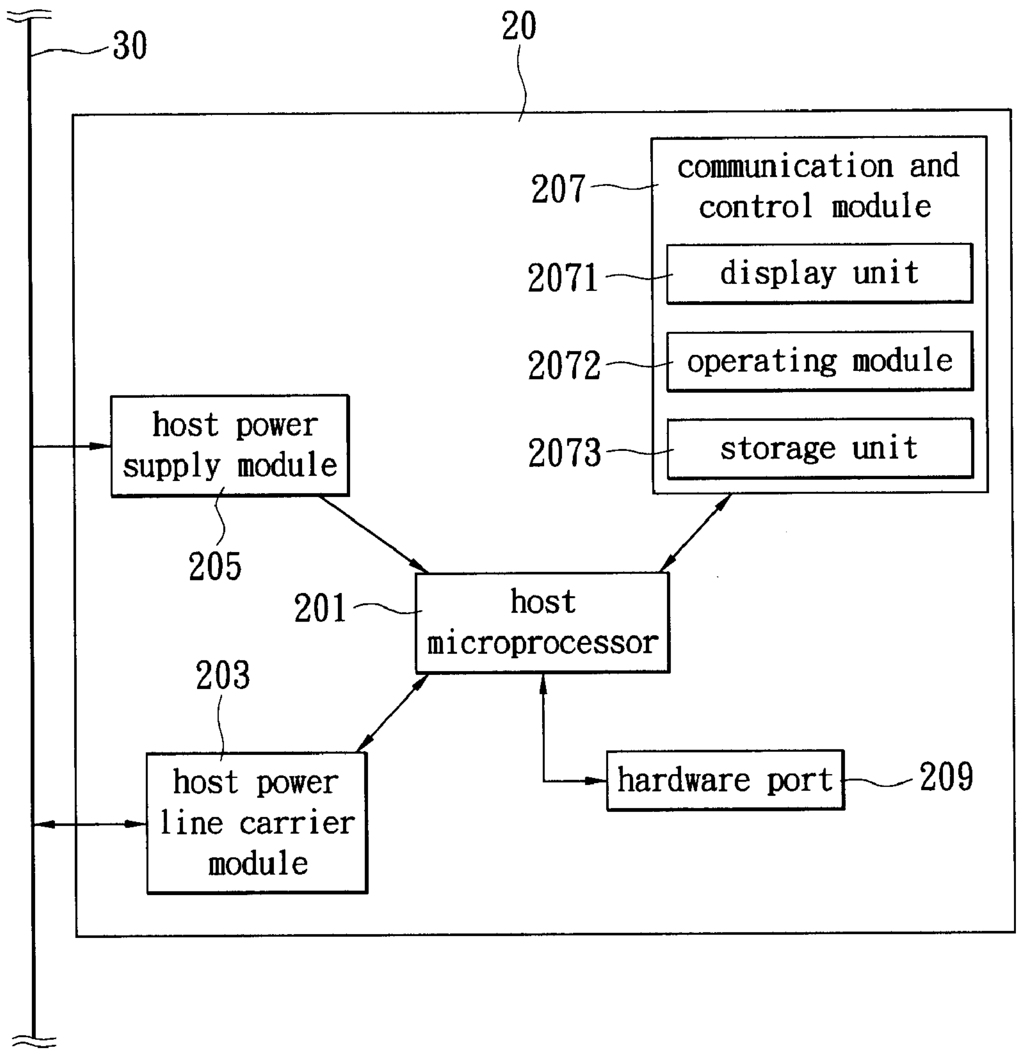
FIG. 2 is a device block diagram of the host controller according to an embodiment of the present invention.

Referring to FIG. 2, showing a device block diagram of the host controller 20 according to an embodiment of the present invention, the host controller 20 mainly comprises a host microprocessor 201, for data and signal processing and device control; a host power line carrier module 203, which is coupled with the host microprocessor 201, for data and signal modulation and demodulation on the electric power conductor 30; a host power supply module 205, which is coupled with the host microprocessor 201, for regulating the power from the electric power conductor 30; and a communication and control module 207, which is coupled with the host microprocessor 201, for user operation, monitoring, and control. Therein the modulation schemes of the host power line carrier module 203 may be differential phase shift keying (DPSK), orthogonal frequency division multiplexing (OFDM), or frequency shift keying (FSK), etc.; and the communication and control module 207 includes a display unit 2071 for displaying data, an operating module 2072 for user control, and a storage unit 2073 for storing signal data.

Referring to FIG. 2 again, the host controller 20 further comprises a hardware port 209, which is coupled with the host microprocessor 201, for device connecting, such as a computer.

Figure 3:
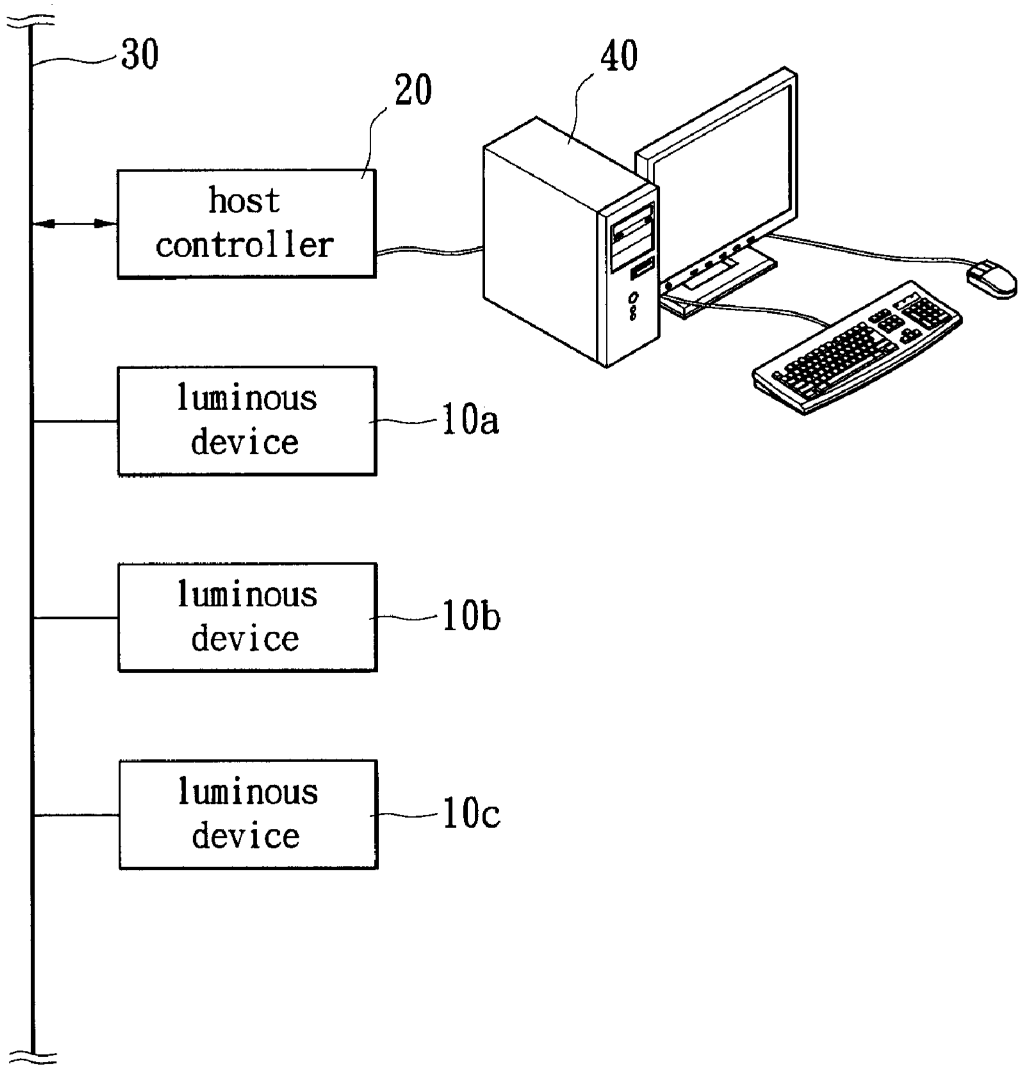
FIG. 3 is a block diagram of a system for controlling LED according to an embodiment of the present invention.

As shown in FIG. 3, corresponding to FIG. 1 and FIG. 2, the host controller 20 transmits data to and from the luminous devices 10*a*, 10*b*, and 10*c* through the electric power conductor 30 (power transmission line). The environmental data collection modules 111 of the luminous devices 10*a*, 10*b*, and 10*c* sense the environmental circumstances, and send the set of environmental data to the host controller 20 by the terminal power line carrier modules 103 through the electric power conductor 30. The host power line carrier module 203 of the host controller 20 receives the set of environmental data from the luminous devices 10*a*, 10*b*, and 10*c*; after proper analysis, the host controller 20 then sends control signals to those luminous devices 10*a*, 10*b*, and 10*c* by the host power line carrier module 203 through the electric power conductor 30, so as to control the illumination, color, and color temperature of the LED 107 of luminous devices 10*a*, 10*b*, and 10*c* according to the environmental circumstances. The host controller 20 may connect to a computer 40 through the hardware port 209, and the computer 40 is for user monitoring, control, and operation. Wherein the data and signals transmitted between the host controller 20 and the luminous devices 10*a*, 10*b*, and 10*c* are all through the electric power conductor 30, thus reducing the number of necessary transmission lines.

Figure 4:
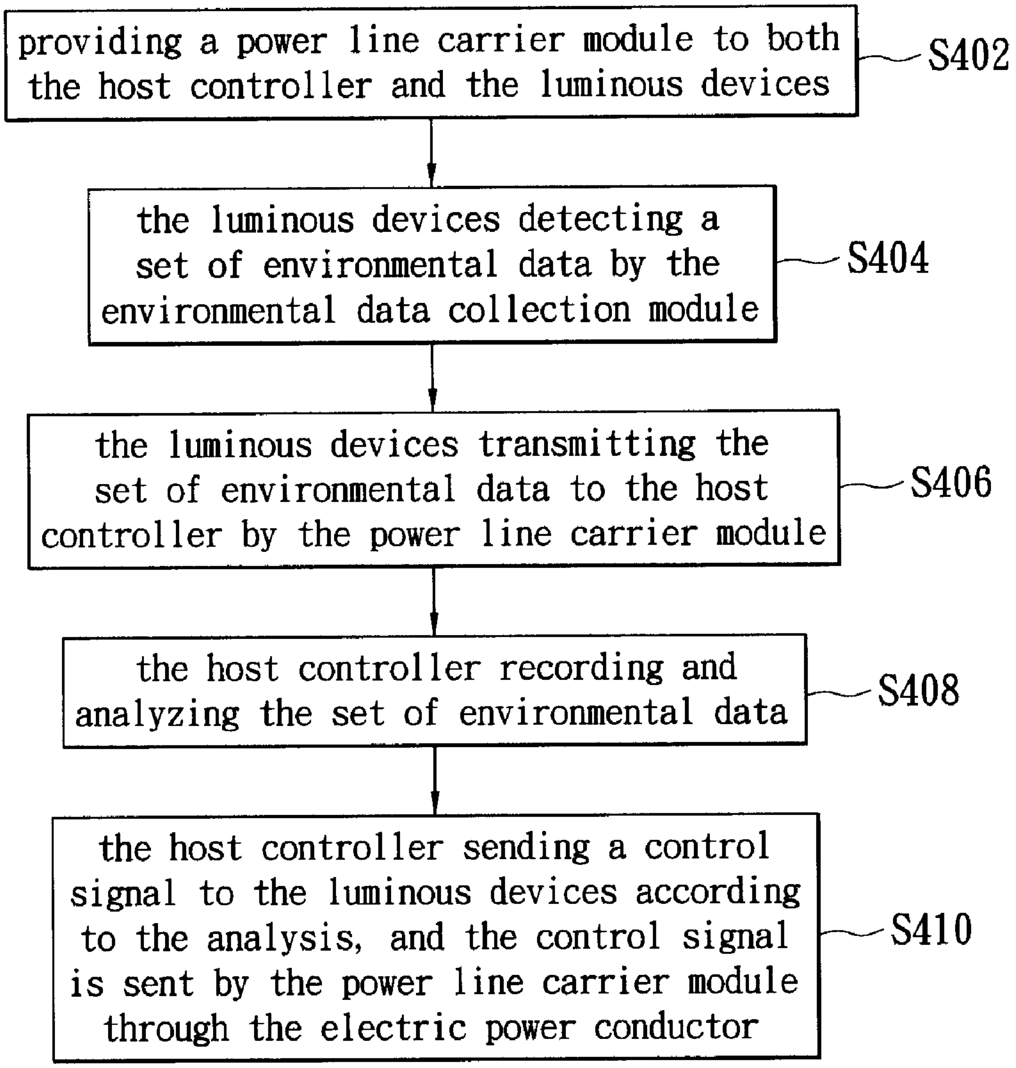
FIG. 4 is a flow chart indicating a method for controlling LED according to an embodiment of the present invention.

FIG. 4 shows a flow chart indicating a method for controlling LED according to an embodiment of the present invention, corresponding to FIG. 1 and FIG. 2. The method works in the system for controlling LED with power line carrier, wherein the system contains a host controller 20, an electric power conductor 30, and at least a luminous device 10, and the luminous device 10 further containing an environmental data collection module 111. The method comprising steps of providing a power line carrier module to both the host controller 20 and the luminous devices 10 (S402); the luminous devices 10 detecting a set of environmental data by the environmental data collection module 111 (S404); the luminous devices 10 transmitting the set of environmental data to the host controller 20 (S406); the host controller 20 recording and analyzing the set of environmental data (S408); and the host controller 20 sending control signals to the luminous devices 10 according to the analysis (S410). Therein the set of environmental data contains an illumination data, a visibility data, an object sensing data, a voice sensing data, and a power consumption data; and the luminous device 10 further comprise an address setting module 113 for setting device address of the luminous device 10. All of the control signals and the sets of environmental data are transmitted by the power line carrier modules through the electric power conductor 30.

By using the power line carrier technologies to transmit the control signals and the environmental data, the amount of LED wirings can be reduced. Therefore, the costs, resources consumption, and difficulties of setting up and removing the LED wirings are lowered according to the present invention.

The description above only illustrates specific embodiments and examples of the present invention. The present invention therefore covers various modifications and variations made to the structures and operations described herein, as delineated within the scope of the present invention as defined in the following appended claims.

What is claimed is:

1. A system for controlling LED with power line carrier, comprising:

at least a luminous device for illumination, containing a terminal microprocessor for data and signals processing and calculation;

a terminal power line carrier module, which is coupled with the terminal microprocessor, for data modulation and demodulation;

a terminal power supply module, which is coupled with the terminal microprocessor, for providing static power supply;

at least a LED, which is coupled with the terminal microprocessor and the terminal power supply module;

at least a LED driving module, which is coupled between the terminal microprocessor and the LED, and between the terminal power supply module and the LED, for regulating electric current and voltage, protecting the LED, and controlling the LED;

a host controller for controlling the luminous device, containing a host microprocessor for signals and data processing and control;

a host power line carrier module, which is coupled with the host microprocessor, for data and signals modulation and demodulation;

a host power supply module, which is coupled with the host microprocessor, for providing static power supply;

a communication and control module, which is coupled with the host microprocessor, for providing user with control capability; and an electric power conductor, which is connecting with the terminal power line carrier module, the terminal power supply module, the host power line carrier module, and the host power supply module, for carrying electric power and signals;

whereby the data and signal transmitting between the host controller and the luminous device are all through the electric power conductor, and do not need any extra transmission line.

2. The system as in claim 1, wherein the terminal power line carrier module uses DPSK modulation scheme to modulate and demodulate the data and signals transmitted through the electric power conductor.

3. The system as in claim 1, wherein the color of the light emitting diodes contain red, yellow, blue, green, white, infrared, or ultraviolet.

4. The system as in claim 1, wherein the LED driving modules uses pulse width modulation (PWM) to regulate the voltage and electric current, and to protect the light emitting diodes from improper power input.

5. The system as in claim 1, wherein the electric power conductor is a power line.

6. The system as in claim 1, wherein the host power line carrier module uses DPSK modulation scheme to modulate and demodulate the data and signals transmitted through the electric power conductor.

7. The system as in claim 1, wherein the luminous device further containing an environmental data collection module, which is coupled with the terminal microprocessor, for sensing environmental circumstances.

8. The system as in claim 7, wherein the environmental data collection module further containing a luminance sensor, a visibility sensor, an object sensor, a voice sensor, and a power consumption sensor.

9. The system as in claim 1, wherein the luminous device further containing an address setting module, which is coupled with the terminal microprocessor, for setting device address of the luminous device.

10. The system as in claim 1, wherein the communication and control module further containing an operating module, for luminous device control by user.

11. The system as in claim 7, wherein the communication and control module further containing a display unit, for displaying the data collected by the environmental data collection module.

12. The system as in claim 7, wherein the communication and control module further containing a storage unit, for storing the data collected by the environmental data collection module.

13. The system as in claim 1, wherein the host controller further containing a hardware port, which is coupled with the host microprocessor, for connecting with a computer, and the computer is for analysis, monitoring, and control.

14. The system as in claim 13, wherein the hardware port is a USB port or an RS232 port.

15. A method for controlling LED with power line carrier, applicable to a system for controlling LED, wherein the system contains a host controller, an electric power conductor, and at least a luminous device, and the luminous device further containing an environmental data collection module, comprising:

providing a power line carrier module to both the host controller and the luminous devices;

the luminous devices detecting a set of environmental data by the environmental data collection module;

the luminous devices transmitting the set of environmental data to the host controller, wherein the set of environment data is sent by the power line carrier module through the electric power conductor;

the host controller recording and analyzing the set of environmental data; and the host controller sending a control signal to the luminous devices according to the analysis, wherein the control signal is sent by the power line carrier module through the electric power conductor.

16. The method as in claim 15, wherein the electric power conductor is a power line.

17. The method as in claim 15, wherein the set of environmental data contains an illumination data, a visibility data, an object sensing data, a voice sensing data, and a power consumption data.

18. The method as in claim 15, wherein the luminous device further comprises an address setting module for setting device address of the luminous device.

* * * * *